United States Patent [19]

Smith

[11] 4,076,538

[45] Feb. 28, 1978

[54] PROCESS FOR CROSSLINKING HYDROPHILIC COLLOIDS WITH TRIAZINE COMPOUNDS

[75] Inventor: Norman Alfred Smith, Ilford, England

[73] Assignee: Ciba-Geigy AG, Basel, Switzerland

[21] Appl. No.: 631,566

[22] Filed: Nov. 13, 1975

[30] Foreign Application Priority Data

Dec. 3, 1974 United Kingdom ............... 52241/74

[51] Int. Cl.$^2$ .............................................. C09H 7/00
[52] U.S. Cl. ................................... 96/111; 106/125; 260/117; 526/9
[58] Field of Search .............. 260/117; 526/9; 96/111; 106/125

[56] References Cited

U.S. PATENT DOCUMENTS

| | | | |
|---|---|---|---|
| 3,033,842 | 5/1962 | Hoitschmidt | 526/9 |
| 3,325,287 | 6/1967 | Yamamoto et al. | 260/117 X |
| 3,701,664 | 10/1972 | Piller et al. | 96/111 |

FOREIGN PATENT DOCUMENTS

| | | |
|---|---|---|
| 1,311,736 | 3/1973 | United Kingdom. |
| 1,320,936 | 6/1973 | United Kingdom. |

OTHER PUBLICATIONS

J. Chem. Soc. 1963, p. 4133, Horobin.

*Primary Examiner*—Howard E. Schain
*Attorney, Agent, or Firm*—Burgess, Dinklage & Sprung

[57] ABSTRACT

The present invention relates to a process for crosslinking hydrophilic materials by means of a triazine compound of the formula

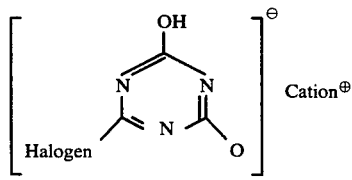

The process is preferably used for crosslinking gelatin in photographic material.

11 Claims, No Drawings

PROCESS FOR CROSSLINKING HYDROPHILIC COLLOIDS WITH TRIAZINE COMPOUNDS

The use of triazine compounds as crosslinking agents for hydrophilic colloids and in particular gelatin is known from the German Auslegeschrift No. 1,284,290. In German Offenlegungsschrift No. 1,547,750 there are described other triazine compounds which function as crosslinking agents for hydrophilic compounds. These triazine compounds have two reactive groups.

It is the object of the present invention to provide a process for crosslinking hydrophilic colloids using substituted triazine compounds having only one reactive halogen.

According to the present invention there is provided a process for crosslinking hydrophilic colloids which contain amino, imino and/or hydroxyl groups, which comprises incorporating into the hydrophilic colloid as a crosslinking agent a compound of the formula I

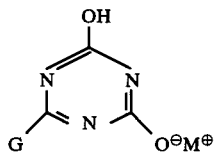

wherein G is a halogen atom and M is a cation.

The cation M may be for example a hydrogen ion or a lithium, sodium, potassium, rubidium, caesium, magnesium or calcium ion or it may be an ammonium or substituted ammonium ion. However preferably M is a sodium ion. Preferably G is a chlorine atom.

The compounds of formula (1) may be prepared by hydrolysing cyanuric halide as described by S. Horobin. J. Chem. Soc. 1963, page 4133.

The crosslinking process of the present invention can be used in the textile and leather industry, the manufacture of paper and the plastics, glue and gelatin industry. Above all, it can be used as a process for hardening water-soluble colloids for example polyvinyl alcohol, gelatin or gelatin derivatives, especially when these colloids are in the form of layers of photographic materials. The reaction of these colloids with the triazine compounds of use in the present invention in general takes place easily, and in the usual manner. The triazine compounds are, sufficiently water-soluble to be used as aqueous solutions.

In most cases in order to carry out the process of the present invention it suffices to add the triazine compounds of use in the present invention as an aqueous solution or in a solid form which is as finely divided as possible, to an aqueous solution of the hydrophilic colloid, with good stirring.

Thus, a solution of the triazine crosslinking agent in water, or mixed with, for example, ethanol, methanol or acetone, can be brought together with the colloids at normal or slightly raised temperature. Gelatin, which optionally may contain silver halide and/or other components required to produce photographic images, has proved particularly suitable for crosslinking by the process of the present invention. The coating solution which is an aqueous solution containing both gelatin and the triazine cross-linking agent can, in the usual way, be coated on a substrate to form a layer, and be dried. The layer can then be left at raised temperature or at room temperature for a certain time, for example up to 24 hours. Thereupon cross-linking, which is evidenced by hardening of the layer, takes place rapidly and progressively; the melting point of the gelatin is raised substantially, for example from 25° to 60° C, and the reciprocal swelling factor increases correspondingly.

The amount of the triazine cross-linking agent used depends on the desired degree of hardening of the gelatin layer required but is suitably from 0.1 to 10 percent by weight based on the weight of the dry gelatin.

A particular advantage of the process of the present invention is that when the triazine cross-linking agents are used at a low concentration they impart a sufficient degree of hardness to the gelatin layers in 18 to 24 hours, so that the coated material can be tested by processing a sample immediately following its manufacture, even if the test be carried out at a raised temperature or in strong processing baths.

It is a further advantage that during the process of the present invention, no significant change in pH of the gelatin layer occurs.

The cross-linking or hardening effect itself is very stable; even after prolonged storage at temperatures around 40° C and at a relative atmospheric humidity of about 70%, the reciprocal swelling factor remains above 0.2 (compare Table 1).

Further the degree of hardening is also not changed significantly by acids or bases even on prolonged action, which indicates that the hardener-gelatin bond created has great resistance to hydrolysis.

The triazine compounds of use in the present invention are furthermore generally sufficiently soluble in water and sufficiently stable in aqueous solutions to enable the process of the present invention to be used in the preparation of photographic material. Thus, for example, it is particularly desirable — for the continuous manufacture of photographic materials — that batches of solutions of cross-linking agents should remain stable at room temperature for several hours or days and that its concentration should not decrease or should only do so insignificantly. Also it is important that in the coating solution, at about 40° C, the hardener should undergo very little or no decomposition and very little or no reaction with water during the requisite standing time and dwell time, so as to maintain its full cross-linking action over the course of several hours, during coating, drying and storage of the photographic material.

Furthermore, the viscosity of the coating solution should not significantly increase during the standing time as a result of the addition of the hardener. It is also particularly important that even on prolonged treatment of the coated layer at raised temperature and atmospheric humidity conditions the hardener should not cause any yellowing, fogging of photographic material or effect on the graduation of the material on development.

The compounds of use in the process of the present invention fulfil the above desiderate very well. In particular they hydrolyse very little when present in an aqueous solution. They do not discolour gelatin. When these compounds are added to a gelatin solution they cause only a small increase in the viscosity of the solution and thus such solutions can be coated without difficulty. The compounds have a good hardening effect over a wide pH range and thus can be used in the preparation of a wide range of photographic materials. Furthermore the compounds are easy to produce in high yield and the starting material, usually cyanuric chloride, is cheap.

Thus the process of the present invention is suitable for hardening (cross-linking) all the layers in photographic material containing gelatin for example, intermediate layers, emulsion layers, base layers, top layers, backing layers and anti-halation layers. The layers can contain not only the cross-linking agents but also additives of the most diverse kind for example, silver halide, pigments, such as barium sulphate, titanium dioxide or silicon dioxide or those of organic nature, such as coloured pigments, and also image dyestuffs, colour coupling agents, latices, sensitisers, filter dyestuffs, antihalation dyestuffs and light screening dyestuffs, emulsion stabilisers, UV absorbers, optical brighteners and even other cross-linking agents.

Therefore according to a preferred embodiment of the present invention there is provided a process for the production of photographic material which comprises adding an aqueous solution of a triazine of formula I to an aqueous gelatino silver halide emulsion, coating the mixture on to a photobase and drying the coated layer.

Preferably the amount of triazine of formula I used in this aspect of the present invention is from 0.1 to 10 percent by weight based on the weight of the dry gelatin used in the aqueous solution.

In the Example which follows 2-chloro-4,6-dihydroxy-1,3,5-triazine sodium salt has been used an the cross-linking agent of formula (1), this compound has the formula

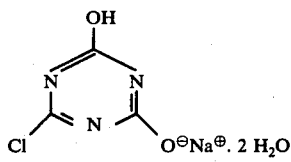 (2)

EXAMPLE

In the Example which follows, the reciprocal swelling factor is used as a measure of the hardening. The samples were prepared as follows:

6 ml of a 6% strength gelatine solution, 1 ml of a 1% strength dyestuff solution of the formula

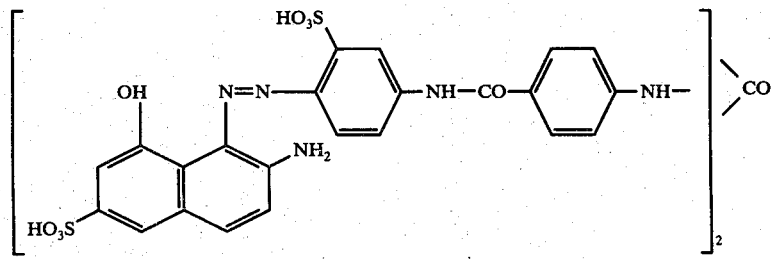

1 ml of a 25.10$^{-3}$ molar solution of hardener 1 and 5 ml of deionised water are mixed and the pH adjusted to 4.5–7.5. The solution is coated on a 13 cm × 18 cm triacetate film. After solidification at 10° C, the layer is dried over the course of 1 hour at approx. 20° C. (The dyestuff merely serves to make the samples more readily visible during the swelling measurements.) Some samples of the coated film were stored under room conditions (NK, approx. 20° C, 50% relative atmospheric humidity) and other samples were incubated (CL, 43° C, 69% relative atmospheric humidity). To determine the reciprocal swelling factor, a thin section of approx. 20 μ is prepared from each of the samples and measured under a microscope. The thickness of the dry gelatin layer is then determined, deionised water is then added and after 4 minutes the thickness of the swollen gelatin layer is measured. The reciprocal swelling factor 1/SF corresponds to the following ratio:

$$1/SF = \frac{\text{Thickness of the dry layer}}{\text{Thickness of the swollen layer}}$$

TABLE I

| Hardener Concentration mM/100g Gel | pH | N.K. 1/SF after | | | | | C.L. 1/SF after | | | | 28 days NK +7 days CL |
|---|---|---|---|---|---|---|---|---|---|---|---|
| | | 3 hours | 2 days | 7 days | 14 days | 28 days | 2 days | 7 days | 14 days | 28 days | |
| 7 | 4.5 | 0.128 | 0.208 | 0.231 | 0.233 | 0.256 | 0.303 | 0.274 | 0.286 | 0.315 | 0.235 |
| 7 | 5.5 | 0.033 | 0.169 | 0.210 | 0.212 | 0.207 | 0.284 | 0.273 | 0.282 | 0.273 | 0.231 |
| 7 | 6.5 | 0.078 | 0.125 | 0.181 | 0.175 | 0.195 | 0.276 | 0.241 | 0.242 | 0.241 | 0.201 |
| 7 | 7.5 | 0.064 | 0.084 | 0.114 | 0.144 | 0.162 | 0.208 | 0.207 | 0.188 | 0.204 | 0.146 |

The above results show that the compounds of formula (1) are efficient gelatin cross-linking agents and that they act over a wide pH range.

I claim:
1. A process for cross-linking hydrophilic colloids which contain amino and/or hydroxyl groups, which comprises incorporating into the hydrophilic colloid as a cross-linking agent a compound of the formula

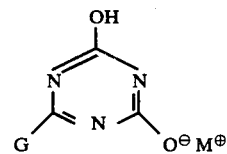

wherein G is a halogen atom and M is a cation.
2. A process according to claim 1 where M is a sodium ion.
3. A process according to claim 1 wherein G is a chlorine atom.
4. A process according to claim 1 wherein the hydrophilic colloid is polyvinyl alcohol, gelatin or a gelatin derivative.
5. A process according to claim 4 which the polyvinyl alcohol, gelatin or gelatin derivative is used as a layer in photographic material.

6. A process according to claim 5 wherein polyvinyl alcohol, gelatin or gelatin derivative also comprises silver halide.

7. A process according to claim 1 where the triazine compounds as defined in claim 1 are added as an aqueous solution or in finely divided solid form to an aqueous solution of the hydrophilic colloid, with good stirring.

8. A process for the production of photographic material which comprises adding an aqueous solution of the triazine cross-linking agent as defined in claim 1 to an aqueous gelatino silver halide emulsion, coating the mixture on to a photobase and drying the coated layer.

9. A process according to claim 8 wherein from 0.1 to 10 percent by weight based on the weight of dry gelatin in the aqueous solution of the triazine hardening agent is used.

10. A hydrophilic colloid which has been cross-linked by the process of claim 1.

11. Photographic material which has been prepared using the process claimed in claim 8.

* * * * *